(12) United States Patent
Shawcross et al.

(10) Patent No.: US 8,112,847 B2
(45) Date of Patent: Feb. 14, 2012

(54) WIRE ETC, CONNECTORS

(75) Inventors: Brian Edward Shawcross, Nottinghamshire (GB); Lee Mark Giemza, Wakefield (GB)

(73) Assignee: Gripple Limited (GB)

( * ) Notice: Subject to any disclaimer, the term of this patent is extended or adjusted under 35 U.S.C. 154(b) by 111 days.

(21) Appl. No.: 12/810,395

(22) PCT Filed: Mar. 4, 2009

(86) PCT No.: PCT/GB2009/000580
§ 371 (c)(1),
(2), (4) Date: Jun. 24, 2010

(87) PCT Pub. No.: WO2009/112806
PCT Pub. Date: Sep. 17, 2009

(65) Prior Publication Data
US 2010/0279540 A1  Nov. 4, 2010

(30) Foreign Application Priority Data

Mar. 12, 2008 (GB) .................................... 0804546.0
Jun. 17, 2008 (GB) .................................... 0811008.2

(51) Int. Cl.
*A44B 1/04* (2006.01)
*A44B 11/25* (2006.01)
*A44B 17/00* (2006.01)
*F16G 11/00* (2006.01)

(52) U.S. Cl. ..................... 24/136 R; 403/396; 24/115 M
(58) Field of Classification Search .................. 403/314, 403/326, 389, 391, 396; 24/115 M, 130, 24/136 R; 439/436, 488, 836; 294/102.1; 248/56, 65, 67.5, 74.1, 317
See application file for complete search history.

(56) References Cited

U.S. PATENT DOCUMENTS

| 2,387,436 | A |   | 10/1945 | Frank |
| 3,776,586 | A |   | 12/1973 | Ahlgren et al. |
| 3,927,441 | A |   | 12/1975 | Anzini |
| 4,634,205 | A | * | 1/1987  | Gemra .......................... 439/391 |

(Continued)

FOREIGN PATENT DOCUMENTS

GB          1 217 911           1/1971

(Continued)

*Primary Examiner* — Michael P Ferguson
*Assistant Examiner* — Nahid Amiri
(74) *Attorney, Agent, or Firm* — Clark Hill PLC

(57) ABSTRACT

A connector or locking device for wires (or wire ropes) W has a body (20) of alloy, two channels (21) within the body, entry ends (23) at opposite ends for wires, and wedges (25) within the body urged by springs (26) towards the entry ends (23) and to protrude into the channels (21) for the purpose of gripping inserted wires and preventing their withdrawal in the opposite direction to insertion, and is characterized in that guideways (30) are formed within the body (20) alongside each channel from adjacent its entry end (23) to beyond its wedge (25), and plastics slide (31) are fitted one within each of the guideways each with its inner end (32) overlapping a nose part (33) of the respective wedge and its outer end (34) protruding outwards beyond the entry end of the channel, retention means (35, 36) being provided between each slide (31) and its guideway (30) while allowing inward sliding to push the wedge (25) against the urge of its spring (26) when the outer end (34) of the slide is pushed relative to the body to release an inserted wire for withdrawal or adjustment of its position relative to the body.

12 Claims, 6 Drawing Sheets

U.S. PATENT DOCUMENTS

| | | | |
|---|---|---|---|
| 4,807,333 A * | 2/1989 | Boden | 24/712.5 |
| 5,015,023 A * | 5/1991 | Hall | 294/102.1 |
| 6,003,210 A * | 12/1999 | Facey et al. | 24/130 |
| 6,058,574 A * | 5/2000 | Facey et al. | 24/136 R |
| 7,063,299 B2 * | 6/2006 | Facey et al. | 248/328 |

FOREIGN PATENT DOCUMENTS

| | | | |
|---|---|---|---|
| GB | 2240581 A * | 8/1991 |
| GB | 2322408 A * | 8/1998 |
| WO | 95/30844 | 11/1995 |
| WO | 03/019040 | 3/2003 |

* cited by examiner

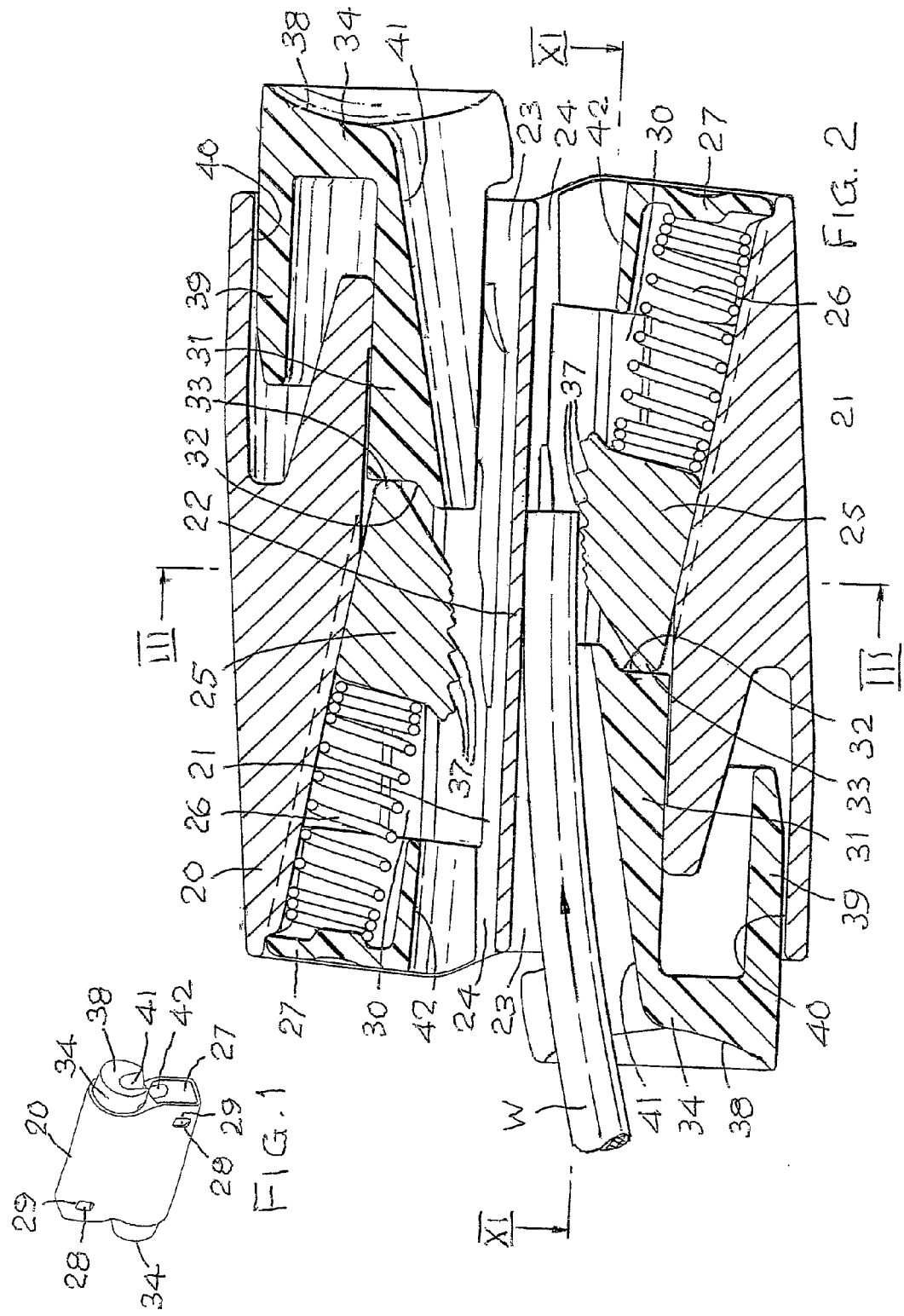

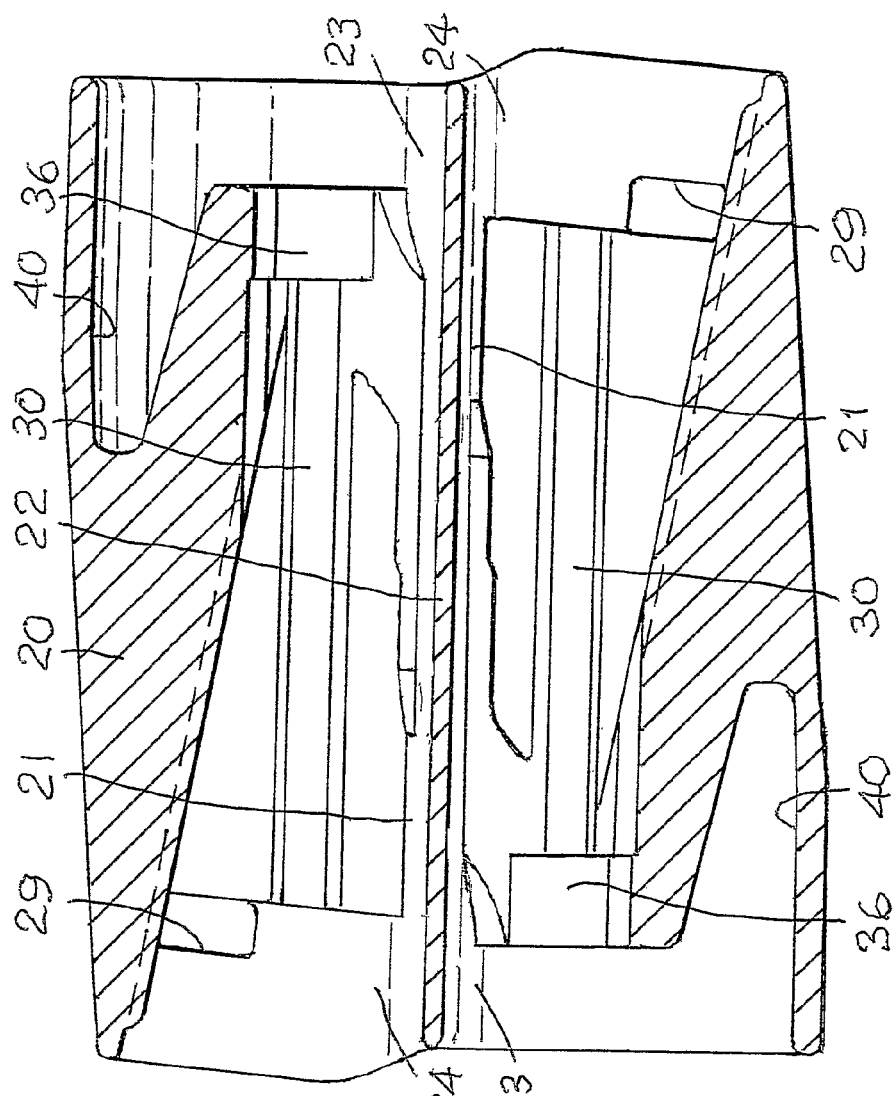
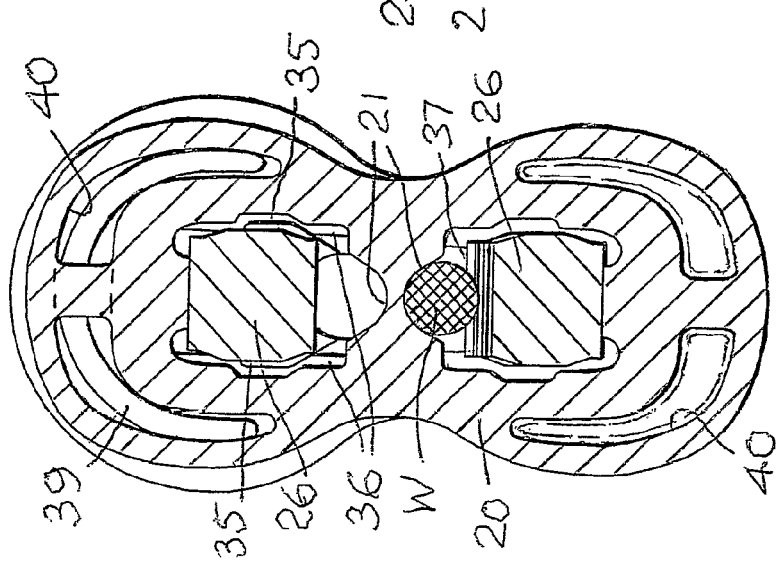

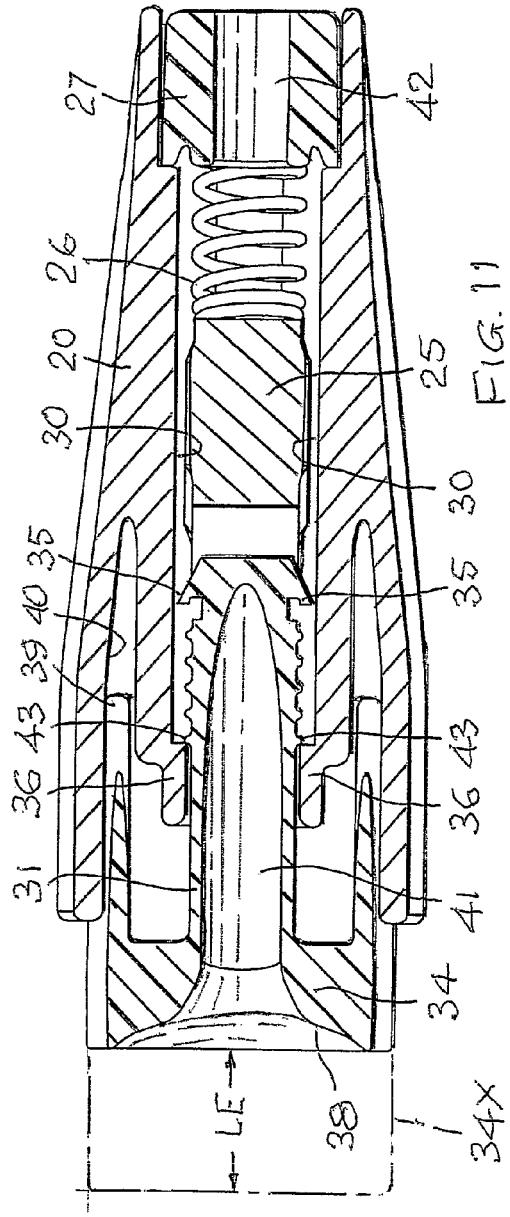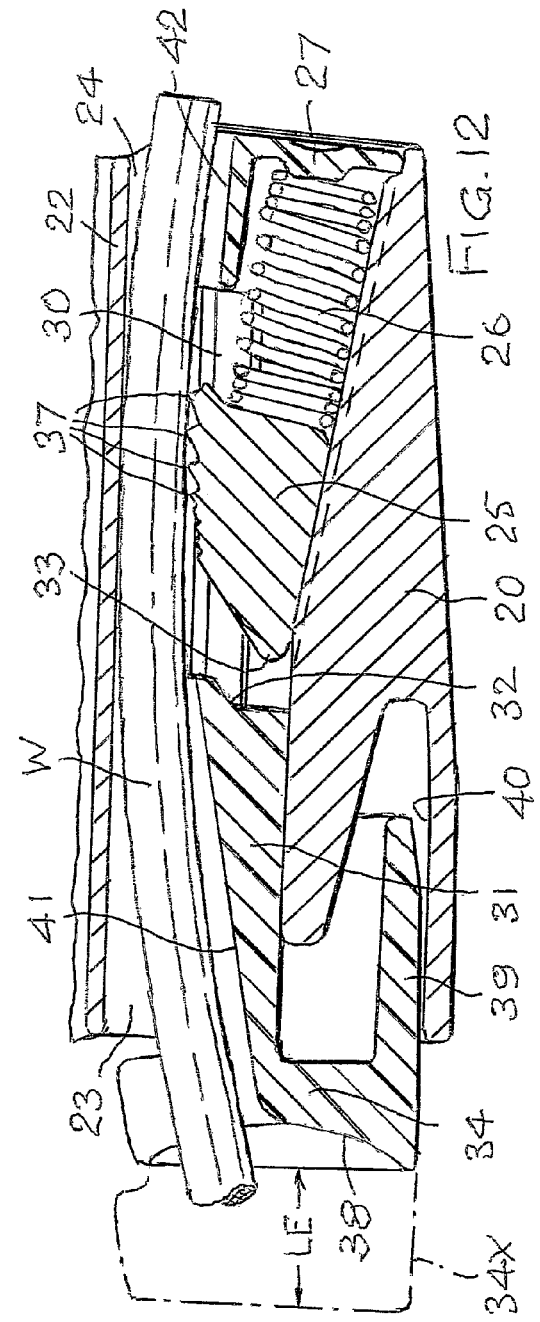

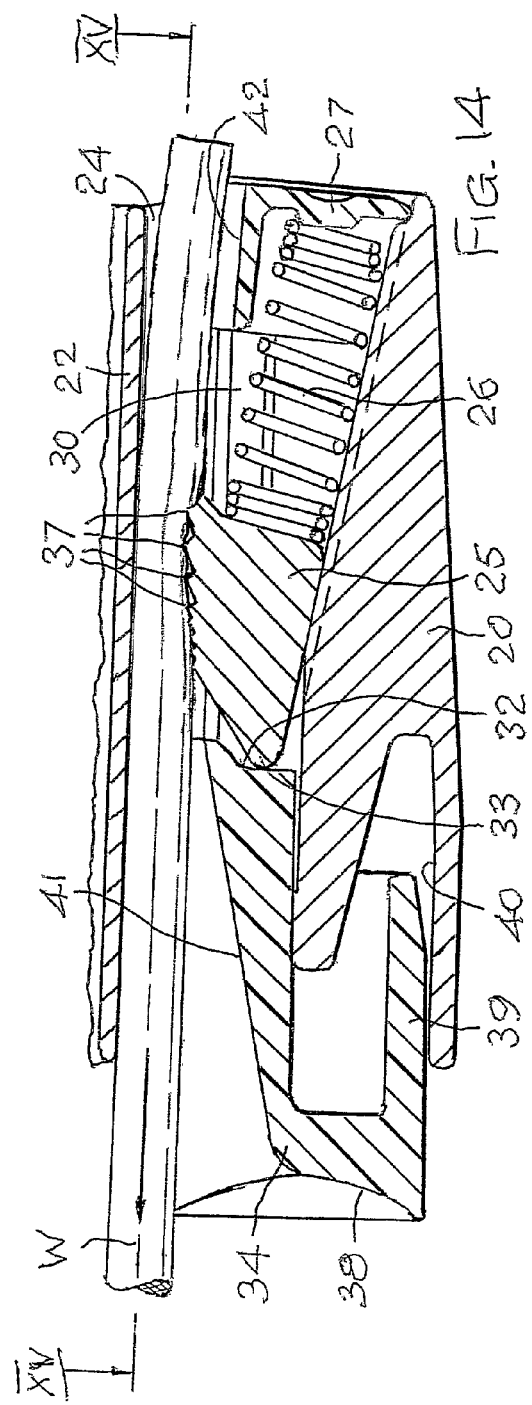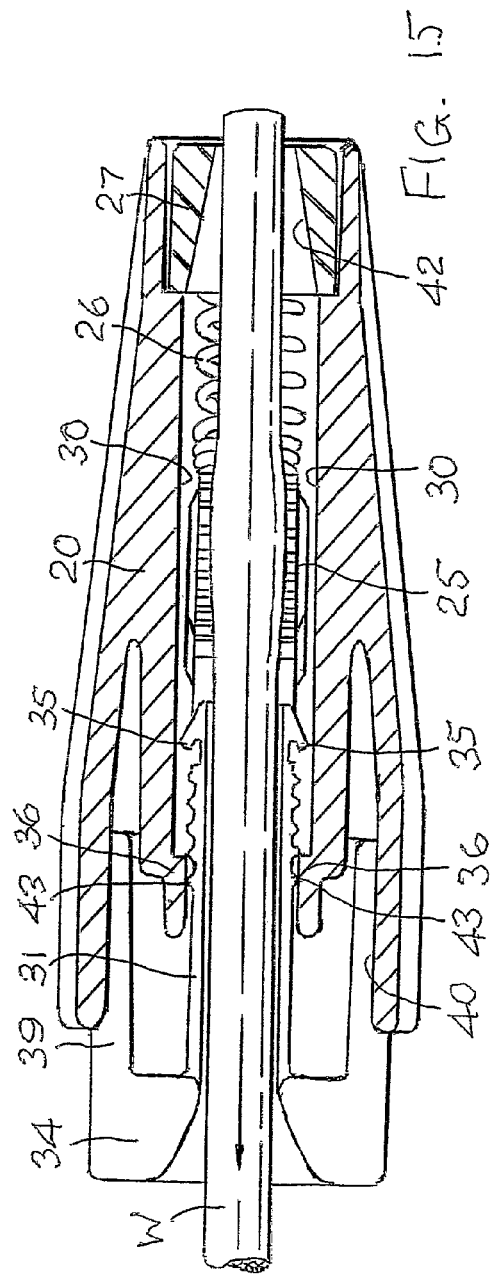

WIRE ETC, CONNECTORS

RELATED/PRIORITY APPLICATION

This application is a National Phase filing regarding International Application No. PCT/GB2009/000580, filed on Mar. 4, 2009. International Application No. PC/IMB2009/000580 relies upon British Application No. GB0804546.0, filed on Mar. 12, 2008 and British Application No. G13081 1008.2, filed on Jun. 17, 2008 for priority.

BACKGROUND OF THE INVENTION

This invention relates to connectors or locking devices for wires, wire ropes or cables (hereinafter referred to simply as "wires") of the type having a body, two channels within the body, entry ends at opposite ends for wires, and wedging means within the body spring-urged towards the entry ends and protruding into the channels for the purpose of gripping inserted wires and preventing their withdrawal in the opposite direction to insertion. The wedging means may consist of rollers, cams or wedges, usually provided with ribs to enhance their grip.

It is also known to provide such a connector with means for withdrawing the wedging means from the channels to release either or both wires, which withdrawing means comprises pins extending laterally from the wedging means through slots in opposite sides or one side only of the body, with or without knobs on the outside to facilitate sliding of the pins along the slots; see, for example, U.S. Pat. No.2,387,436 (Frank), GB-A-1 217 911 (Pasbrig) and U.S. Pat. No.3,927,441 (Anzini) or the Zip-Clip® device marketed by Zip-Clip Ltd. A disadvantage of these withdrawing means is that the slots in the side or sides of the body weaken it.

It is also known to form the body of such a connector or locking device with both channels extending therethrough in back-to-back relationship with a thin wall between them and with small holes alongside the entry ends of the channels for insertion of a separate rod-like tool to push either of the wedging means against its spring urge to effect release of the respective inserted wire; see, for example, WO-A-95/30844 and WO-A-03/019040. It is a disadvantage of this form of release means that the body of the connector has to be held in one hand while the other hand inserts the rod-like tool into one or other of the small holes and therefore not leaving a hand free to withdraw or adjust the position of the released wire. Another disadvantage lies in having a separate release tool that can be lost or mislaid.

Therefore, it is the object of the present invention to overcome these disadvantages.

BRIEF SUMMARY OF THE INVENTION

According to the present invention, a connector or locking device for wires of the type having a body, two channels within the body, entry ends at opposite ends for wires, and wedging means within the body spring-urged towards the entry ends and to protrude into the channels for the purpose of gripping inserted wires and preventing their withdrawal in the opposite direction to insertion, is characterised in that guideways are formed within the body at least one alongside each channel from adjacent its entry end to beyond its wedging means, and slides are fitted one within each of the guideways each with its inner end overlapping part of the respective wedging means and its outer end protruding outwards beyond the entry end of the channel, retention means being provided between each slide and its guideway to retain the slide within its guideway while allowing inward sliding to push the wedging means against its spring-urge when the outer end of the slide is pushed relative to the body.

Thus, a wire can be inserted one into the entry end of either channel (or both) alongside the respective slide until the leading wire end meets the non-overlapped portion of the respective wedging means and pushes it against its spring-urge until the wire end passes beyond the wedging means, whereafter it can be gripped between the latter and the channel.

When it is required that the wire be released, for withdrawal from or adjustment of its position relative to the body, the outer end of the respective slide can be pushed by the thumb or a finger of a hand gripping the body until the inner end of the slide meets the respective wedging means and pushes it against its spring-urge until the wire is free and can be withdrawn or its position altered by the other hand.

Furthermore, when a pair of wires connected by the device are both to be released both slides can be pushed relative to the body by pressing their outer ends, one by the thumb and the other by a finger of one hand, leaving the other hand free to withdraw or adjust the wires, or one wire, or to move the device lengthwise relative to one wire looped back through the device, e.g. in the manner described in WO-A-03/019040.

Each retention means may comprise a first projection on the guideway side of the slide and a second projection in the guideway, with flexibility in the slide or the first projection and appropriate beveling of the first projection enabling it to snap over the second projection as the slide is inserted in the guideway during assembly of the connector or locking device.

While the channels may be disposed end-to-end or side-by-side they are preferably disposed back-to-back in close lengthwise relationship with each other and separated by a wall portion which may be capable of localised distortion to increase frictional contact with inserted wires under the urge of the wedging means.

The body may be formed of an alloy e.g. zinc alloy, by die-casting, and the slides may be formed of plastics; and each slide may be provided at its outer end with an enlargement, e.g. a substantially circular button, possibly with a concave face and/or ribs to enhance the grip of a thumb or finger.

When no wires have been inserted into the channels, each slide could protrude from the respective entry end of the respective channel by at least the available length of travel of the respective wedging means by spring urge, limited only by the first projection coming into abutment with the second projection to prevent withdrawal of the slide from the body, and so the portions of the slides protruding from the body make them vulnerable during assembly, transport and on-site before insertion of wires.

Therefore at least a third projection is preferably provided on the guideway side of each slide, of lesser prominence than the first projection but capable of snapping over the respective second projection in succession to the first projection, thereby positioning the respective wedging means close to where it would be when preventing withdrawal of an inserted wire.

Thus the respective slide will protrude from the body by a lesser extent equal to the spacing of the first and third projections, and so will be less vulnerable. In addition, it will be easier for an inserted wire to push past the respective wedging means because the latter protrudes into the respective channel to a lesser extent and does not have to be pushed as far by the wire against the spring urge as it would in the absence of the third projection.

However, the reason for the lesser prominence of the third projection is to enable it to snap back over the second projection in the event of an inserted wire or wires becoming overloaded, when the consequently increased protrusion of the slide from the body gives a visual indication of the overloading.

Further additional lesser projections may be provided to yield to a progressive overload, with resultant progressive further protrusion of the slide from the body giving visual indication of its progression.

Preferably, at least first and third projections are provided on each of two opposite faces of the slide to cooperate with respective second projections on corresponding sides of the guideway, thus resulting in a balanced loading between respective second and third projections.

Plastics caps are preferably snap-fitted one into each end of the body to retain a respective compression spring for urging the respective wedging means into the respective channel; and each cap may provide an exit aperture for the respective channel of a size fractionally smaller than the diameter of wire with which the device is to be used, thus providing a visual deterrent to attempts to insert a wire at the wrong end, but readily yieldable to a wire inserted correctly through the entry end and past the respective wedging means.

BRIEF DESCRIPTION OF THE DRAWING

An embodiment of the invention will now be described, by way of example only, with reference to the accompanying drawings, in which:—

FIG. 1 is a general view of the connector or locking device shown actual size, all subsequent figures being on a scale about five times greater;

FIG. 2 is a longitudinal section of the device with a wire being inserted;

FIG. 3 is a cross-section of the device taken from the line III-III of FIG. 2;

FIG. 4 is a longitudinal section of the body of the device alone;

FIG. 11 is a longitudinal section of the whole device taken from the line XI-XI of FIG. 2 before insertion of the wire;

FIG. 12 corresponds to the lower half of FIG. 2 but showing the inserted wire gripped by the wedge;

FIG. 14 corresponds to FIG. 12 but shows the wire under tension and overload; and FIG. 15 is a part-sectional view taken from the line XV-XV in FIG. 14.

DETAILED DESCRIPTION OF THE INVENTION

Figure 8:
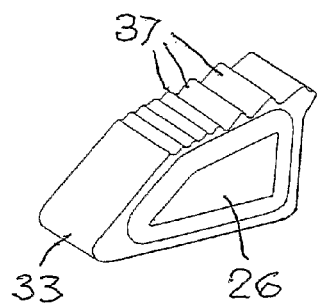
FIG. 8 is a general view of one of the wedges seen in FIGS. 2 and 3.
Figure 9:
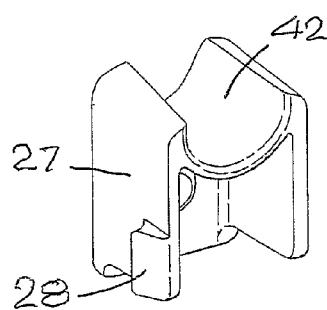
FIG. 9 is a general view of one of the plastics caps seen in FIGS. 1 and 2.
Figure 10:
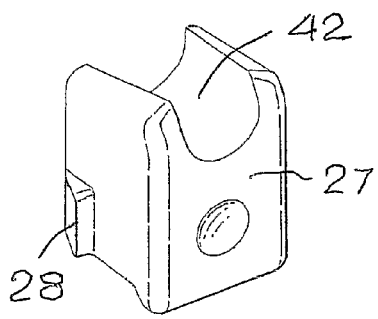
FIG. 10 is a view of one of the plastics caps seen in the opposite direction to FIG. 9.

The connector or locking device for wires of 2.00 mm diameter (or wire ropes of 2.00 mm overall diameter) has a zinc alloy body 20, two channels 21 within the body in back-to-back relationship with a thin wall 22 between them, entry ends 23 at opposite ends for wires W (only one shown) and exit ends 24, wedges 25 (see FIG. 8 for detail) of sintered steel within the body urged by coil compression springs 26 towards the entry ends and to protrude into the channels for the purpose of gripping inserted wires and preventing their withdrawal in the opposite direction to insertion, the springs being retained in the body by plastics caps 27 (see FIGS. 9 and 10 for detail) secured in the device by lugs 28 snap-fitting into apertures 29 in the sides of the body.

Figure 5:
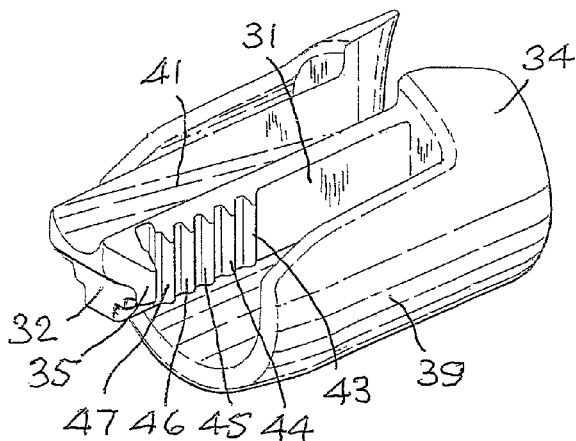
FIG. 5 is a general view of one of the slides seen in FIGS. 1 and 2.
Figure 6:
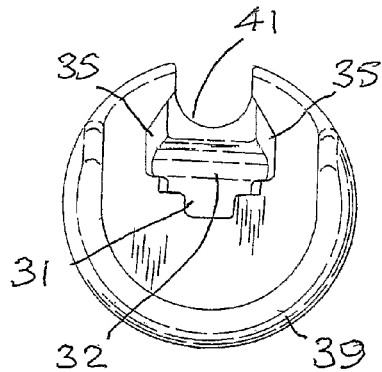
FIG. 6 is an elevation from the left-hand end of FIG. 5.
Figure 7:
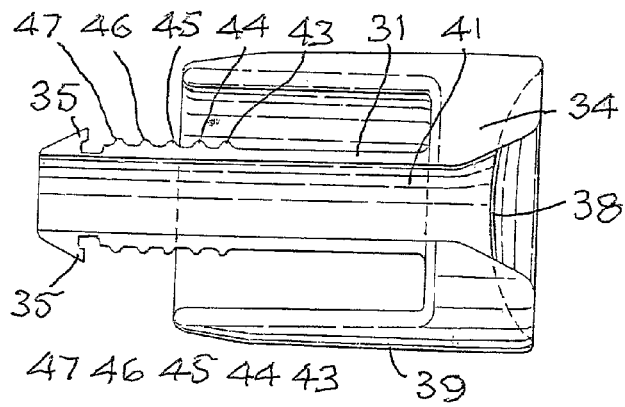
FIG. 7 is a plan view of one of the slides.

In accordance with the first aspect of the present invention, guideways 30 are formed within the body 20 alongside each channel 21 from adjacent its entry end 23 to beyond its wedge 25, and plastics slides 31 (see particularly FIGS. 5 to 7 for detail) are fitted within the guideways each with its inner end 32 overlapping a nose part 33 of the respective wedge and its outer part 34 protruding outwards beyond the entry end of the channel, retention means in the form of first projections 35 on the slides and second projections 36 in the guideways, flexibility and beveling of the first projections (which are seen to be barb-like) enabling them to snap over the second projections as the slides are inserted into the guideways during assembly of the device but thereafter preventing withdrawal of the slides from the device.

FIG. 2 shows a wire W being inserted into one of the channels 21 of the device and the end of the wire meeting one of a series of transverse ribs 37 on the non-overlapped portion of the respective wedge 25, to enable the wire to push the wedge against the urge of its spring 26, until the wire end passes beyond the wedge (as shown by FIG. 12) whereafter the wire can be gripped between the wedge and the channel, to prevent withdrawal of the wire in the opposite direction to insertion.

Figure 13:
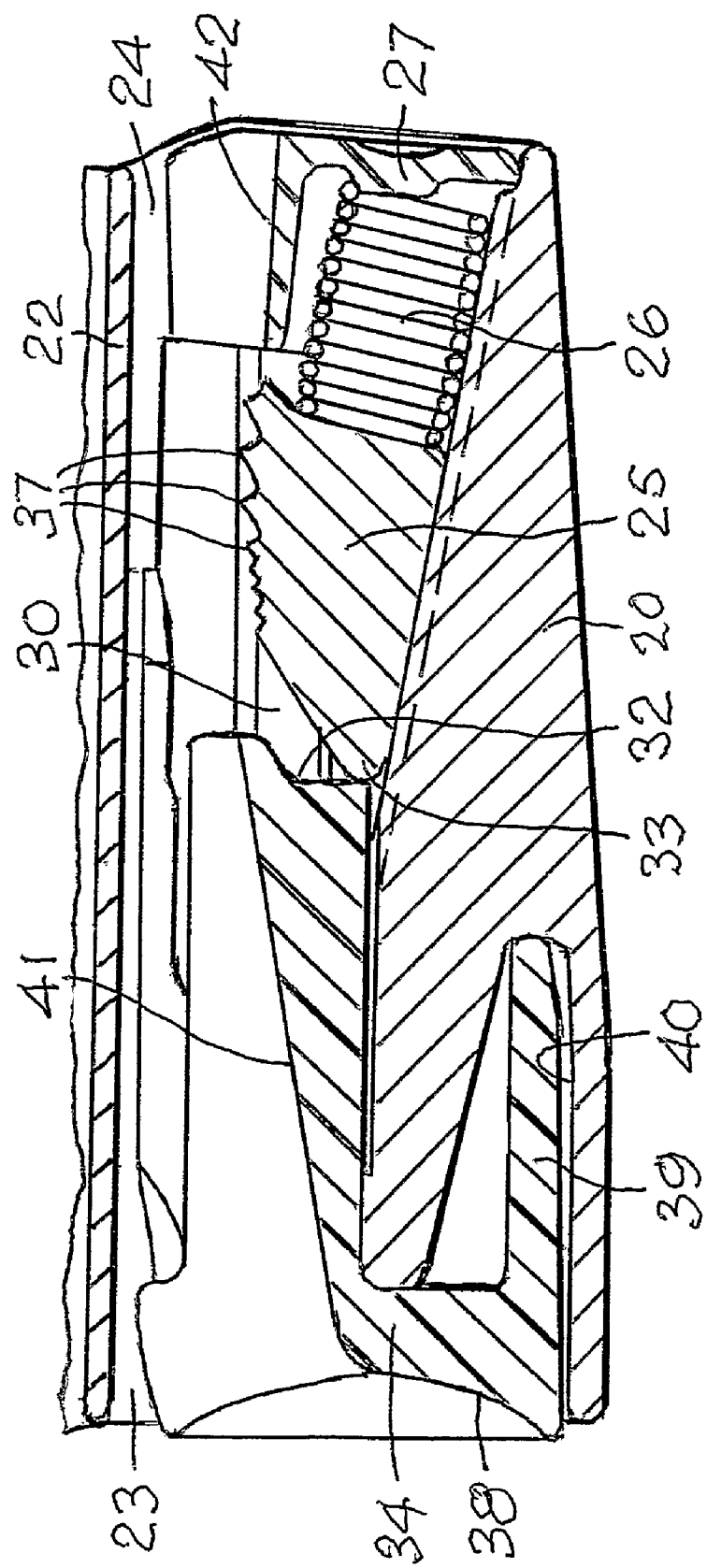
FIG. 13 corresponds to FIG. 12 but shows the wedge pushed in by the slide against the spring-urge to permit withdrawal of the inserted wire.

When it is required that the wire W be released, for withdrawal from or adjustment of its position relative to the body 20, the outer end 34 of the respective slide 31 can be pushed by the thumb or finger of a hand (not shown) gripping the body until the inner end 32 meets the nose part 33 of the respective wedge 25 and pushes it against the urge of its spring 26 (as shown by FIG. 13) until the wire is free and can be withdrawn or its position altered by the other hand. The outer end 34 of each slide 31 is in the form of a substantially circular button with a concave face 38 to enhance the grip of a thumb or finger, and has a semi-cylindrical portion 39 extending therefrom and loosely guided in a complementary recess 40 in the body 20. Each slide 31 has a flared groove 41 forming an entry guide for a wire being inserted, and each cap 27 has a flared groove 42 forming an exit guide for the end of an inserted wire.

It will be seen in FIG. 11, which along with FIG. 2 represents the "as sold" condition of the device, that the projections 35 on the slide 31 do not abut the projections 36 in the guideways 30; this is because at least a pair of third projections 43 is provided on the guideway side of each slide, of lesser prominence than the first projections, thereby positioning the respective wedge 25 close to where it would be when preventing withdrawal of an inserted wire W (cf. FIGS. 2 and 12); whereas, if in the "as sold" condition the projections 35 abutted the projections 36, the portions 34 of the slides 31 protruding from the body 1 would protrude to the extent indicated by the broken lines 34X in FIGS. 11 and 12, making them vulnerable during assembly, transport and on-site before insertion of wires. Thus the respective slide 31 will normally protrude from the body 1 by a lesser extent LE equal to the spacing of the first and third projections and so will be less vulnerable.

In addition, it will be easier for an inserted wire W to push past the respective wedge 25 because the latter protrudes into the respective channel 22 to a lesser extent and does not have to be pushed as far by the wire against the urge of the spring 26 as it would in the absence of the third projections 43.

However, the reason for the lesser prominence of the projections 43 is to enable them to snap back over the projections 36 in the event of an inserted wire or wires becoming overloaded, as illustrated by FIGS. 14 and 15, when the consequential increased protrusions of the portion 34 of the slides 31 from the body 1 gives a visual indication of the overloading.

Further additional pairs of lesser projections 44, 45, 46, 47 (FIGS. 5 and 7 only) are provided to yield to a progressive overload, with resultant further protrusions of the slide 31 from the body 1 giving visual indication of its progression.

The provision of at least first and third projections 35, 43 on each of two opposite faces of the slide 31 to cooperate with respective second projections 36 in corresponding guideways results in a balanced loading between respective second and third projections 36, 43.

The invention claimed is:

1. A connector or locking device for wires, the connector or locking device having a body, two channels within the body, entry ends at opposite ends for the wires, and wedging means slidably disposed within each channel of the body spring-urged towards the entry ends and to protrude into the channels for the purpose of gripping inserted wires and preventing their withdrawal in the opposite direction to insertion, characterised in that guideways are formed within the body at least one alongside each channel from adjacent the entry end of the channel to beyond the respective wedging means disposed within the channel, and slides are fitted one within each of the guideways each with an inner end of the slide overlapping part of the respective wedging means and an outer end of the slide protruding outwards beyond the entry end of the channel, retention means being provided between each slide and its guideway to retain the slide within its guideway while allowing inward sliding to push the wedging means against its spring-urge when the outer end of the slide is pushed relative to the body to allow withdrawal of the wires from their respective channels, and the retention means preventing withdrawal of the slides from their respective guideways.

2. A connector or locking device as in claim 1 characterized in that each retention means comprises a first projection on the guideway side of the slide and a second projection in the guideway, with flexibility in the slide or the first projection and appropriate bevelling of the first projection enabling it to snap over the second projection as the slide is inserted in the guideway during assembly of the connector or locking device.

3. A connector or locking device as in claim 1, characterized in that the channels are disposed back-to-back in close lengthwise relationship with each other and separated by a wall portion capable of localised distortion to increase frictional contact with inserted wires under the urge of the wedging means.

4. A connector or locking device as in claim 1, characterized in that the body is formed of an alloy and the slides are formed of plastics.

5. A connector or locking device as in claim 4, characterized in that each slide is provided at its outer end with an enlargement.

6. A connector or locking device as in claim 5, characterized in that the enlargement is a substantially circular button.

7. A connector or locking device as in claim 6, characterized in that the button has a concave face to enhance the grip of a thumb or finger.

8. A connector or locking device as in claim 6, characterized in that the button has ribs to enhance the grip of a thumb or finger.

9. A connector or locking device as in claim 1, characterized in that at least a third projection is provided on the guideway side of each slide, of lesser prominence than the first projection but capable of snapping over the respective second projection in succession to the first projection, thereby positioning the respective wedging means close to where it would be when preventing withdrawal of an inserted wire.

10. A connector or locking device as in claim 9, characterized in that the lesser prominence of the third projection enables it to snap back over the second projection in the event of an inserted wire or wires becoming overloaded, when the consequently increased protrusion of the slide from the body gives a visual indication of the overloading.

11. A connector or locking device as in claim 10, characterized in that further additional lesser projections are provided to yield to a progressive overload, with resultant progressive further protrusion of the slide from the body giving visual indication of its progression.

12. A connector or locking device as in claim 1, characterized in that at least first and third projections are provided on each of two opposite faces of the slide to cooperate with respective second projections on corresponding sides of the guideway, thus resulting in a balanced loading between respective second and third projections.

* * * * *